United States Patent [19]

Manning et al.

[11] Patent Number: 4,625,248
[45] Date of Patent: Nov. 25, 1986

[54] ULTRA-THIN TAPE CASSETTE TRANSPORT

[75] Inventors: George H. Manning, Nashua; Pasquale R. Riccio, Salem, both of N.H.

[73] Assignee: Memtec Corporation, Salem, N.H.

[21] Appl. No.: 494,638

[22] Filed: May 16, 1983

[51] Int. Cl.$^4$ .................. G11B 5/008; G11B 15/00; G11B 17/00; G11B 21/08

[52] U.S. Cl. ............................ 360/96.5; 360/93; 360/106; 360/60

[58] Field of Search .............. 242/198; 360/85, 93, 360/96.1, 96.2, 96.5, 96.6, 106, 60, 132

[56] References Cited

U.S. PATENT DOCUMENTS

| | | | |
|---|---|---|---|
| 3,008,012 | 11/1961 | Proctor | 360/96.3 |
| 3,475,031 | 10/1969 | Kuehnlein | 360/96.4 |
| 3,532,833 | 10/1970 | Suzuki | 360/106 |
| 3,575,422 | 4/1971 | Peltz et al. | 360/106 |
| 3,656,761 | 4/1972 | Laschenski | 360/106 |
| 3,926,387 | 12/1975 | Hirabayashi | 242/198 |
| 4,057,839 | 11/1977 | Banks | 360/93 |
| 4,156,260 | 5/1979 | Joshi | 360/96.1 |
| 4,303,955 | 12/1981 | Kramer et al. | 360/93 |
| 4,313,143 | 1/1982 | Zarr | 360/106 |
| 4,573,091 | 2/1986 | Barton et al. | 360/93 |

FOREIGN PATENT DOCUMENTS 2248026  4/1973  Fed. Rep. of Germany ..... 360/96.4
58-70454  4/1983  Japan ............................ 360/96.5

Primary Examiner—Stuart N. Hecker
Assistant Examiner—Benjamin E. Urcia
Attorney, Agent, or Firm—Cesari and McKenna

[57] ABSTRACT

An ultra-thin streaming tape cassette transport has its magnetic read/write head assembly mounted on a rigid transverse beam. The front wall of the transport through which a cassette is loaded is fixedly spaced in front of that beam and tracks exist between the front wall and the transverse beam for guiding the cassette to locating surfaces on that beam so that the cassette is positioned precisely vertically relative to the head assembly. A base plate which supports the drive spindles and cassette locating pins is hingedly mounted relative to the transverse beam and front wall so that it is movable between a position wherein the spindles and locating pins intercept the plane defined by the tracks to precisely position the cassette in the other two directions relative to the head assembly and a loading position wherein the spindles and pins are disposed below that plane permitting the cassette to be inserted into and withdrawn from the transport. This construction enables the transport to be unusually thin or short so that two such transports can be received in a receptacle that normally houses a single such transport or disk drive. A transport head assembly is also disclosed which enables the transport to operate on many cassette tape tracks without interference between tracks.

14 Claims, 6 Drawing Figures

ULTRA-THIN TAPE CASSETTE TRANSPORT

This invention relates to a tape cassette transport. It relates more particularly to a streaming type transport which is of unusually thin design.

BACKGROUND OF THE INVENTION

A tape cassette transport records data on and retrieves data from magnetic tape housed in a cassette used in conjunction with the transport. Streaming type transports have more rigorous requirements than an ordinary cassette transport in that they must record and retrieve the data at continuous high rates of speed with short abrupt start and stop operations. Generally, they are intended to provide a reliable low-cost storage backup for present-day rigid disk drives such as the 5¼ inch Winchester drive. One example of such a transport now in use is shown in U.S. patent application Ser. No. 374,046, filed May 3, 1982, now U.S. Pat. No 4,514,775, entitled Streaming Tape Cassette Transport, owned by the assignee of the present application.

From a marketing standpoint, the streaming tape transport must have the same form factor or exterior dimensions as the disk drive to enable it to fit in the same receptacle in the terminal or housing that holds the disk drive. For example, the standard Winchester drive is 3¼ inches high, 5¾ inches wide and about 8 inches long or deep. Consequently, if it is to function as a back-up or replacement for that drive in a standard terminal or housing, the streaming transport must have the same outside dimensions and, indeed, the transport disclosed in the above-mentioned application does.

In general, however, cassette tapes are unable to store much more information than can be stored on a disk. Consequently, it would be desirable to increase the amount of data that can be stored on cassette tape in the volume presently occupied by a standard streaming cassette transport or disk drive.

One way of accomplishing this, of course, is to design the cassette transport so that it is one-half as high as a conventional transport of this type (i.e. 1.625 inches vs. 3.25 inches) so that two such transports with associated tape cassettes can be located in the same envelope or receptacle formerly occupied by one such transport or comparable disk drive, thereby doubling the storage capacity. Yet, if this is to be done, the "thin" transport must still be reliable and easy to use and operate at the same continuous high rates of speed between abrupt start and stop operations as do present-day streaming transports.

OBJECTS OF THE INVENTION

Accordingly, the present invention aims to provide an improved streaming type tape cassette transport.

Another object of the invention is to provide a transport of this type which is only one-half as high as conventional streaming transports so that two such transports can fit in the same space occupied by a single ordinary transport.

A further object of the invention is to provide an ultra-thin streaming-type tape cassette transport which performs reliably over a relatively long operating life.

Still another object of the invention is to provide a transport of this general type which is no more expensive than prior comparable transports which occupy twice as much space.

Yet another object of the invention is to provide such a transport which is quickly and easily assembled by the average production worker and requires minimum maintenance.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, in the present transport, the magnetic read/write head and tape position encoder or tachometer are mounted on a fixed rigid molded plastic transverse beam, thereby assuring reliable cassette positioning relative to those components at each operation. The transport side plates which support the front wall containing the cassette loading slot are mounted to the opposite ends of that beam. A more or less horizontal base plate is positioned just behind the front wall and it is swingably connected to the side plates to permit the base plate to move vertically relative to the front wall from an upper operating position wherein it is more or less aligned with the lower edge of the loading slot therein and a lower loading position wherein the base plate lies well below that slot. The swingable connection between the base plate and the side plates has a long radius so that the excursion of the base plate is more or less along a straight line.

The cassette drive motors and locating pins are mounted on the pivoting base plate and the movement of the plate is such that, when the plate is in its lower position, a cassette can be loaded into and unloaded from the transport through its front slot without interference from the drive spindles and locating pins. Then, when the base plate is moved to its upper operating position, the drive spindles and locating pins are projected into the side of the cassette in the usual way so that, in conjunction with locating surfaces on the rigid plastic crossbeam, they position the working edge of the cassette properly and precisely with respect to the magnetic head and tachometer wheel. The base plate is moved between its two positions by a lever mounted conveniently at the front of the transport.

The magnetic head in the transport is slidably mounted on the crossbeam so that it can move along the vertical axis of the head, i.e. parallel to the locating pins, and be positioned at a multiplicity of positions along that vertical axis by a special profiled cam rotated by a stepper motor mounted with its vertical axis oriented 90° to that of the vertical axis of the head. This configuration allows for a multiple close-tolerance cam stepping design that permits the head to be positioned very precisely along its vertical axis so that the head can write on and read from a multiplicity of closely spaced tracks on the tape without any cross talk between tracks. Resultantly, the transport increases the number of accessible tracks on the tape of a standard cassette. That feature, coupled with the fact that the design of the transport permits all of its components to be housed in an envelope which is unusually thin or short allowing two such transports to be located in the space normally occupied by one transport, means that the transport can store an unusually large amount of data in a given amount of space.

Finally, as will be seen, the present transport is composed of relatively few easily assembled parts so that it can be manufactured and assembled at minimum cost and operate reliably unattended for a prolonged period with minimum required maintenance.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
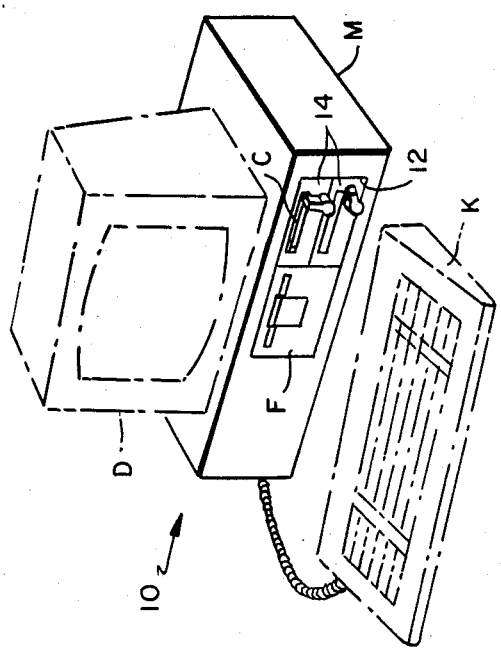
FIG. 1 is perspective view of a terminal containing a pair of streaming tape cassette transports made in accordance with this invention housed in a receptacle normally occupied by a single such transport or comparable disk drive.

Referring to FIG. 1 of the drawings, a standard computer or work station shown generally at 10 includes an intelligent terminal D with an internal microprocessor. The terminal is shown resting on a memory unit M in front of which is the usual keyboard K. A conventional floppy disk drive F is mounted in the left-hand side of unit M. That drive could just as well be a standard rigid disk drive. A receptacle 12 formed in the right side of the memory unit normally houses a conventional disk drive such as a 5¼ inch Winchester drive or a streaming tape cassette transport having approximately the same outside dimensions as the disk drive to provide back-up for the left-hand drive F. Instead, receptacle 12 is able to receive two of the ultra-thin tape cassette transports made in accordance with this invention and indicated generally at 14. Each transport 14 operates in conjunction with a standard reel-to-reel tape cassette C, one being shown in the upper transport, so that the amount of data stored within receptacle 12 is twice as great as would be the case if a conventional streaming transport and associated cassette were contained in receptacle 12 for back-up purposes.

Figure 3:
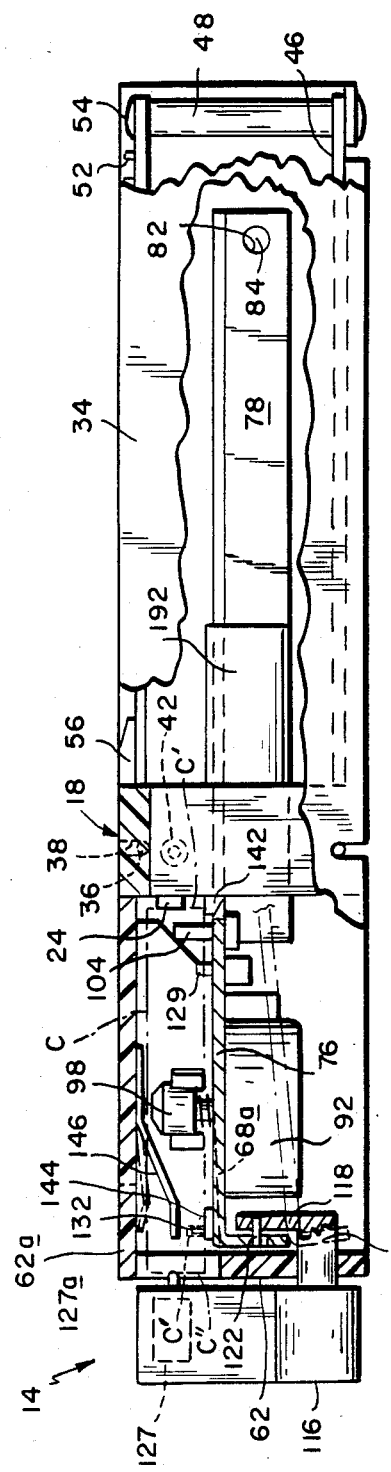
FIG. 3 is a side elevational view with parts broken away of the FIG. 2 transport.
Figure 2:
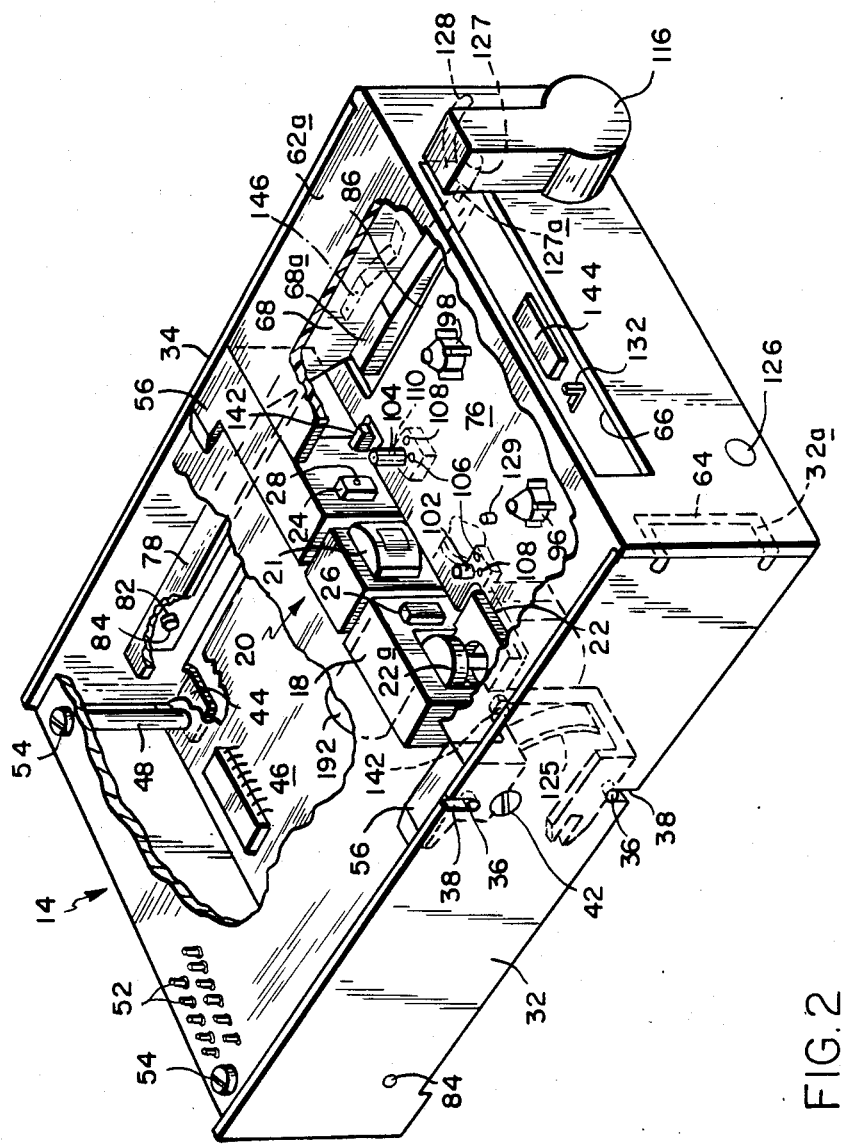
FIG. 2 is a perspective view on a much larger scale with parts broken away showing the transport in greater detail.

Referring now to FIGS. 2 and 3, transport 14 comprises a rigid molded plastic transverse beam 18 which fixedly supports a head assembly indicated generally at 20 including a read/write head 21 and a tachometer or tape position encoder 22. Beam 18 also establishes roughly the position of the cassette working edge C' (FIG. 3) relative to those two components. A pair of tape guides 24 and 26 project forwardly from beam 18 at opposite sides of assembly 20 to align the exposed moving tape segment at the working edge of the cassette with assembly 20 and a tachometer wheel 22a. The right hand tape guide 24 contains a small hole 28 which leads to a light-sensitive diode (not shown) mounted at the rear of beam 18 which constitutes part of an end-of-tape sensor of the type normally found in tape transports.

A pair of relatively long or deep side plates 32 and 34 are mounted at the opposite ends of beam 18. The plates are positioned relative to the beam by pins 36 projecting out from the beam ends and engaging in slots or notches 38 at the upper and lower edges of the plates. Each plate is anchored to the beam by a single screw 42 extending through the plate into the beam. The segments of the plates 32 and 34 extending behind or aft of beam 18 are formed with inward extending tabs 44 at their lower edges. These tabs also support a lower printed circuit (PC) board 46 containing the electrical components required to operate and control the transport. Spacer posts 48 may be anchored to the rearmost tabs 44 to support an upper PC board 52 secured to the posts by screws 54 at the rear corners of the board. The leading edges of the PC boards 46 and 52 are retained by tabs 56 formed at the rear of beam 18 at the opposite ends of the beam adjacent its upper and lower edges, obviating the need of securing screws for the PC boards at those locations. Thus, the boards can be removed for repair or replacement simply by removing the two screws 54 at their rear corners.

Still referring to FIG. 2, the leading edge margins 32a of side plates 32 and 34 are bent toward one another to form keys. Prior to securing the plates to the cross beam 18, the transport front wall 62 is attached to the plates by inserting those keys 33 into slots or keyways 64 formed at the opposite ends of the front wall 62. Thus, when the plates are secured to the cross beam, wall 62 is securely clamped in place between the forward ends of the two side plates and fixed relative to the beam 18.

A relatively long rectangular slot 66 is present in the front wall 62 for loading a cassette C into the transport. Also, the front wall 62 is formed with an integral, rearwardly extending upper skirt 62a and a pair of channels aligned with the opposite ends of slot 66. The lower surfaces of those channels constitute tracks 68a for guiding a cassette inserted through slot 66 to a position wherein its working edge C' is located at the proper position relative to cross beam 18 as will be described shortly.

As best seen in FIGS. 2 and 3, a generally rectangular base plate 76 is situated in the space between cross beam 18, front wall 62 and the two side plates 32 and 34. Formed at the opposite side edges of plate 76 are a pair of long rearwardly extending arms 78 which terminate at locations well behind cross beam 18. Holes 82 are formed adjacent the rear ends of those arms for receiving pivot pins 84 projecting inward from side plates 32 and 34. Those pins thus form pivots allowing plate 76 to be swung vertically relative to front wall slot 66. However, arms 78 are sufficiently long, e.g. 4¼ inches, and the excursion of the plate is sufficiently small, e.g. ¾ inch, that the movement of the plate may be considered straight line movement. Slots 86 extend in from the front or leading edge of plate 76 to provide clearance for the two channels 68 as the base plate is moved.

A pair of electrical drive motors 92 (FIG. 3) are mounted to the underside of plate 76 with their armatures projecting up through appropriate openings in the plate. The usual drive spindles or arbors 96 and 98 are mounted to the motor armatures, being spaced apart the appropriate distance to be received in the openings provided for them in a standard reel-to-reel driven cassette C. Also, projecting up from plate 76 are a pair of cassette locating pins 102 and 104 which are positioned to project into the usual locating holes found in such cassettes. Pins 102 and 104 are made separately from plate 76 and extend up through holes in that plate. The bases of the pins terminate in flat plates 102a and 104a respectively, each having a tiny locating stub 106 which projects into a hole in plate 76 and being anchored to the base plate by a single screw 108.

The locating pin 104 has an axial passage 110 leading to a light-emitting diode (not shown). The light from that diode shines through passage 110 and into the aforementioned passage 28 in tape guide 24 illuminating the diode at the end of the latter passage when a transparent segment of tape is drawn opposite the tape guide 24 thereby initiating an END OF TAPE signal.

As best seen in FIGS. 2 and 3, the plate 76 is swingable between an upper or operating position shown in solid lines in FIG. 3 wherein its upper surface is more or less even with the lower edge of loading slot 66 and tracks 68a and a lower, loading position wherein the plate 76 is disposed appreciably below the slot edge and tracks. When the plate is in that latter position, the drive spindles 96 and 98 and cassette locating pins 102 and 104 repose below the plane defined by tracks 68a so that a cassette C can be inserted through slot 66 and be slid along those tracks toward the head assembly 20. When the plate is in its former operating position, the spindles and locating pins project into the holes formed in the cassette to receive them.

Figure 4:
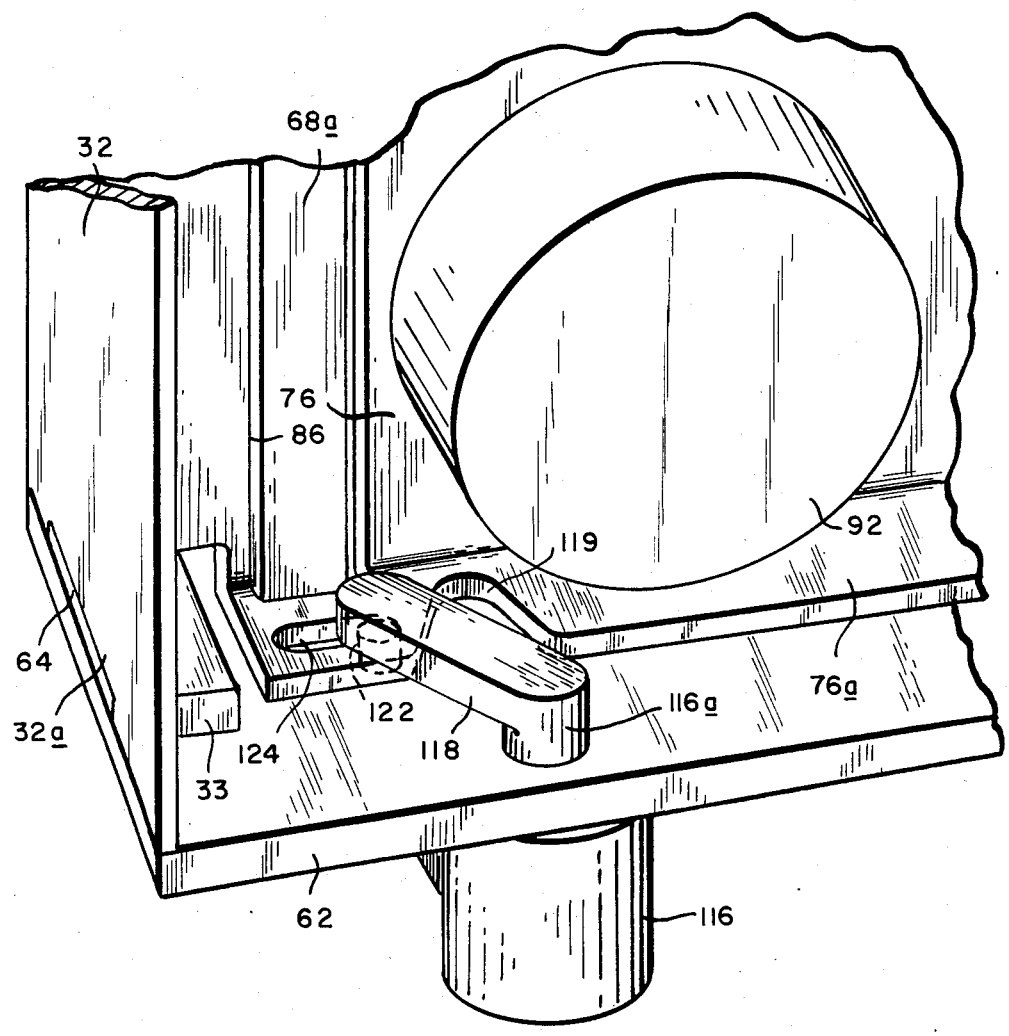
FIG. 4 is a fragmentary perspective view on a still larger scale showing the lever assembly of the FIG. 2 transport.

Referring now to FIGS. 3 and 4, the plate 76 is moved between its two positions by a lever 116 whose pivot post 116a is rotatively mounted in front wall 62 directly below and adjacent the right-hand end of slot 66. An arm 118 extends laterally from the free end of pivot post 116a behind wall 62 and the free end of that arm carries a pin 122. That pin slides along a slot 124 formed in a flange 76a extending down from the front or leading edge of plate 76 just behind wall 62. The swinging of the lever 116 from its vertical orientation shown in FIGS. 2 and 3 clockwise through a relatively small angle, e.g. about 57° suffices to shift plate 76 from its upper operating position to its loading position. As best seen in FIGS. 3 and 4, the upper positions of the plate 76 is positively established by protrusins at the underside of beam 18. The lower position is established by the engagement of the end wall of a clearance notch 119 against pivot post 116a respectively. The plate is releasably maintained in its two positions by a curved leaf spring 125 (FIG. 2) which projects forwardly from an opening in the left-hand end of beam 18, one end of the spring being anchored to the beam.

Referring again to FIG. 2, the transport contains the usual lights and switches found on transports of this type. Thus, a pilot light 126 is mounted in an opening in the lower left corner of front wall 62. Also, a WRITE PROTECT switch 127 is contained in lever 116 with its actuator 127a projecting from the rear face of the lever. That switch is arranged to sense the presence or absence of the WRITE PROTECT tab customarily found at the opposite ends of the rear edge C″ (FIG. 3) of the cassette. If the tab is absent, when lever 116 is swung to its vertical position shown in FIG. 2, the switch actuator will not be depressed. Resultantly, the transport can read from, but cannot write on, the tape in the cassette. A relieved area 128 inscribed in the front surface of wall 62 provides clearance for the switch actuator 127a when the lever 116 is swung clockwise to drop plate 76 to its loading position. The actuator 129 of a CASSETTE LOADED switch mounted to the underside of plate 76 projects up through a small opening in that plate just in front of locating pin 102. The transport will not operate unless that actuator 129 is depressed by the loaded cassette C indicating that the cassette has its preferred side up.

The preferred orientation of the cassette in the transport is detected by a finger 132 which projects up from the forward edge of plate 76. If the cassette orientation is proper, when plate 76 is moved to its operating position, a slot $C_1$ (FIG. 3) normally formed in the rear edge C″ of the cassette at a location spaced from the cassette transverse centerline provides clearance for finger 132. That finger projects into the slot and thus also locks the cassette in the transport. If, however, the cassette is turned over so that its slot $C_1$ does not register with finger 132 when the plate 76 is moved to its loading position, the finger 132 lifts the cassette from the plate so that the cassette does not depress the switch actuator 129 thereby disabling the transport.

Referring now to FIGS. 2 and 3, as mentioned above, transport 14 is able to record data on the tape in the cassette C along a multiplicity of closely spaced tracks because it positions the cassette very accurately relative to head assembly 20. Part of the reason for this is that the assembly 20 (and tachometer 22) remains stationary on rigid beam 18. Also, however, when a cassette is loaded into the transport, the working edge C′ of the cassette is precisely positioned relative to beam 18.

The precise positioning of the cassette in the vertical direction, i.e. along the head 21 axis, is achieved by a pair of locating surfaces 142 projecting from the front face of beam 18 inboard of its ends. When the base plate 76 is in its lower loading position and a cassette is inserted through slot 66, the channel tracks 68a guide the cassette so that its working edge C′ is placed right against those locating surfaces. For this, the forward or leading end segments of those tracks are inclined so that the cassette is urged upwards as the cassette working edge approaches those surfaces 142. Then the tracks level off so that the lower surface of the cassette working edge is deposited right on the locating pads 142.

A third locating pad 144 is formed at the center front of plate 76. That pad is coplanar with the surfaces of pads 142 so that when plate 76 is moved to its operating position, the pad 144 vertically locates the rear edge of the cassette. A pair of leaf springs 146 are secured to the underside of front wall skirt 62a adjacent each side thereof. These springs press down on the cassette aft of its longitudinal centerline so that the cassette is held firmly against the pads 142 and 144.

Also, when the cassette is loaded through slot 66, the tracks 68a guide the cassette to a position that places the locating pins 102 and 104 directly under the cassette openings intended to receive those pins. Consequently, when the plate 76 is moved to its operating position, those pins assuredly project into those openings and thus locate the cassette accurately in the lateral and fore and aft directions relative to head assembly 20. It can be seen from the foregoing, then, that the tracks 68a do not perform any precise locating function; they simply serve to guide the cassette to the pins 102, 104 and the pads 142, 144 which actually perform the locating function.

Figure 5:
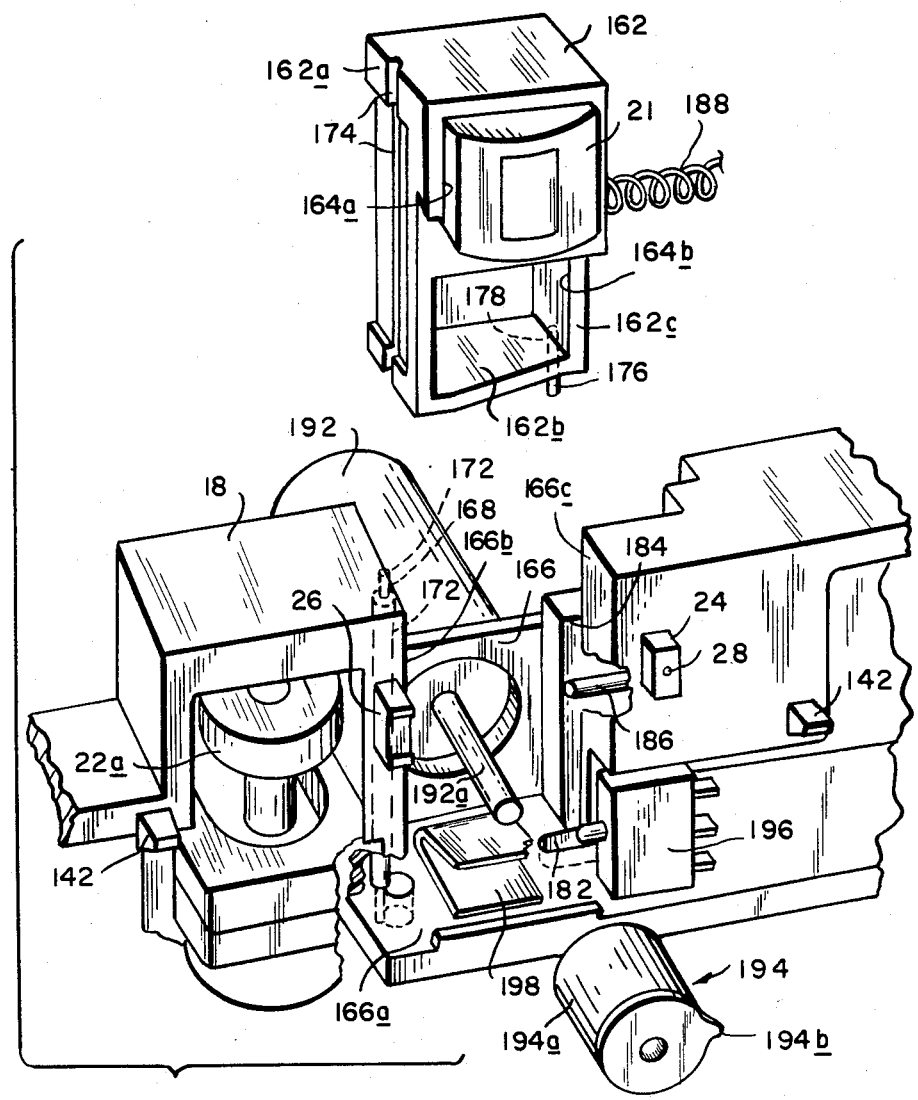
FIG. 5 is a fragmentary exploded perspective view on the scale of FIG. 3 showing the head assembly of the FIG. 2 transport in greater detail.
Figure 6:
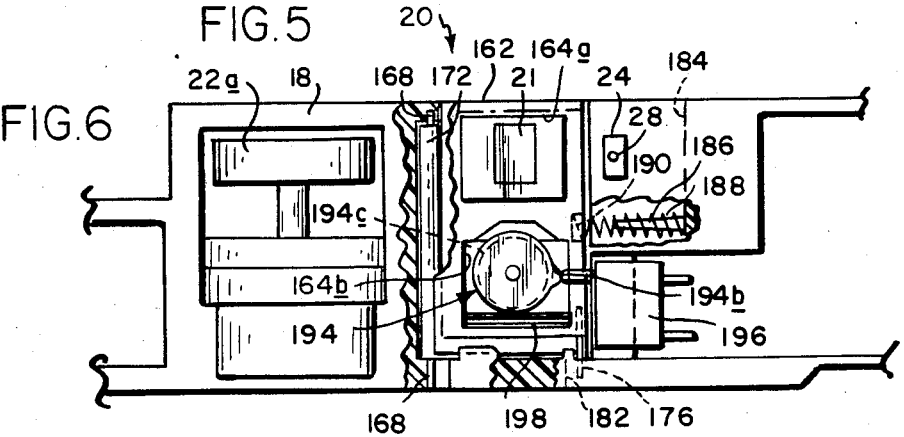
FIG. 6 is a fragmentary front elevational view of that head assembly.

Referring now to FIGS. 5 and 6, the head assembly 20 comprises a generally rectangular molded plastic slider 162 having upper and lower compartments 164a and 164b. Compartment 164a houses the magnetic read/write head 21 which is epoxied in place inside that compartment so that its working surface projects forwardly therefrom. The slider 162 slides in a vertical channel 166 formed in the middle of beam 18 and having a bottom wall 166a. The left-hand wall 166b of the channel is grooved at 168 for receiving a guide rod 172 whose diameter is slightly larger than that of the groove. The rod is snapped into the groove leaving an arcuate segment of the rod projecting from the groove to form a rail for slider 162 whose left wall 162a is grooved at 174 to slidably receive the exposed portion of rod 172. Thus, the slider slides up and down in channel 166, being guided by rod 172. An oversized hole 168a is formed in the channel bottom wall 166a just inboard of the groove 168 so that the lower end of rod 172 can be inserted through that hole and snapped laterally into the groove.

Also, as best seen in FIG. 5, a vertical pin or rod 176 has its upper end inserted into a hole 178 in the bottom wall 162b of slider 162 adjacent its right-hand side wall 162c so that the pin projects down from the slider cage. That pin is arranged to be slidably received in a slot 182 formed in the channel bottom wall 166a adjacent the right-hand side of the channel. When the slider 162 is slidably fitted in channel 166, the slidable engagement of the pin 176 in slot 182 prevents sway of the slider 162 and therefore head 21 relative to beam 18.

Preferably also, a narrow vertical slot 184 is formed in the right-hand channel wall 166c. A post or arbor 186 projects from the bottom wall of that channel midway along its length for supporting a coiled compression spring 188. When the slider 162 resides in channel 166, the free end of the spring engages in a dimple 190 formed in the slider right-hand wall 162c. Thus, the spring urges the slider against the guide rod 172. Yet the spring, being able to flex readily on the arbor, does not impart any binding friction to the slider. Thus, a smooth, uniform sliding movement of the slider in the channel is assured.

Still referring to FIGS. 5 and 6, mounted to the rear wall of beam 18 is a stepper motor 192 which is oriented so that its armature 192a projects into channel 166 and into the lower slider compartment 164b. Mounted to the end of that armature within compartment 164b is a cam shown generally at 194. That cam has two sections, namely an eccentric rear section 194a which bears against the upper wall of slider receptacle 164b and a nose-shaped forward section 194b whose nose actuates a switch 196 when the cam section 194a is positioned to lift slider 162 to its uppermost position in channel 166. The actuation of that switch signals the transport that the head 21 is in its track 1 position relative to the tape in the cassette C so that the transport can read on and write from that first track on the tape. A leaf spring 198 is positioned between the cam section 194a and the bottom wall of the slider compartment 164b to bias the slider downward so that the upper surface of that cam section positively engages the upper wall of compartment 164b.

The stepper motor 192 has a multiplicity, herein ten, stepping positions so that it can rotate the eccentric cam section 194a so as to position the slider 162 at nine discrete elevations or locations in its channel 166 below its uppermost position. The components of the head assembly 20 are designed and arranged so that the head 21 can operate on ten closely-spaced tracks on the cassette tape without crosstalk between tracks and without losing recorded information. Furthermore, the tape can travel at very high rates of speed relative to the head while information is being read from the tape from any one of those tracks. Still further, the tape in the cassette can be started or stopped abruptly through control of the drive spindles 96 and 98 without any danger of the tape breaking or becoming snagged.

To load the transport 14, lever 116 is swung clockwise, thereby dropping base plate 76 to its loading position. The cassette C is then inserted through the loading slot 66 in the cassette front wall and pushed into the transport until its working end C' engages the cross beam 18. At that point, that edge is resting on the locating pads 142. Then the lever 116 is swung counterclockwise to its upright position shown in FIG. 2 whereupon the base plate 76 lifts the pad 144 into position to vertically locate the rear edge of the cassette. The plate also lifts the spindles 96 and 98 and the locating pins 102 and 104 so that they project into the openings provided in the underside of the cassette to receive them. Assuming that the cassette has been inserted with the proper side up, the CASSETTE LOADED switch actuator 128 will be depressed by the cassette and the transport will operate upon command. If the cassette has been loaded upside down, then it will have to be withdrawn and replaced in the proper orientation before the transport will operate.

Through the control circuitry on the PC boards 46 and 52 and in the microprocessor in terminal D (FIG. 1), the transport can be operated to write data on and/or retrieve it from the tape in the cassette C as desired. Furthermore, these read/write operations can be performed on any one of multiple data tracks on the tape by appropriately controlling the stepper motor 192 to raise or lower the magnetic head 21 relative to the tape with assurance that the head will be positioned precisely at the correct location opposite the selected data track any time that particular track is selected.

Thus, two transports 14 each capable of operating on multiple tape tracks can be located in the same receptacle 12 that was designed to contain only a single tape cassette transport or disk drive. Consequently, the present transport should find wide acceptance in the marketplace as back-up storage for floppy and rigid disk drives and tape transports. Yet, with all of these advantages, as can be seen from the above description, the transport 14 is constructed of relatively simple parts which are easily fabricated and assembled. Therefore, the overall manufacturing and maintenance costs associated with the present transport should be a minimum.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A reel-to-reel tape cassette transport for operating on a multiple track tape contained in a cassette having a working edge with a window that exposes the tape therein, said transport comprising
   A. a rigid transverse beam member extending along a first axis;
   B. a magnetic head assembly rigidly mounted to the transverse member, said head assembly including a head movable relative to the base along a second axis perpendicular to said first axis;

C. A front wall mounted a fixed distance in front of the transverse member;

D. means defining a cassette receiving slot in the front wall;

E. cassette locating means integral with and projecting from the transverse member on each side of the head assembly toward said front wall while locating the cassette working edge opposite the head assembly along a locating axis parallel to said second axis;

F. means defining a loading plane and for guiding the cassette from the slot to the transverse member so that the working edge of the cassette seats against, and is located by said locating means;

G. support means positioned between the transverse member and the front wall for supporting a cassette inserted into the receiving slot;

H. drive spindles projeting up from the support means;

I. upstanding cassette locating pins mounted to the support means between the transverse member and the spindles for locating the cassette along a third axis perpendicular to said first and second axes J. means for hinging the support means relative to the transverse member so that the support means can swing between an operating position wherein the spindles and locating pins project up through said plane and a loading position wherein the spindles and pins are disposed below said plane, and K. means for moving the support means between said operating and loading positions.

2. The transport defined in claim 1 wherein

A. front wall mounting means extend fore and aft of the transverse member; and

B. the hinging means comprise
  (1) a pair of arms extending from the support means to a location aft of the transverse member; and
  (2) pivot means for pivotally connecting the aft ends of the arms to the mounting means.

3. The transport defined in claim 2 wherein the arms exceed four inches in length so that the excursion of the support means between its two positions is substantially along a straight line.

4. The transport defined in claim 2 and further including circuit board means mounted to the front wall mounting means aft of the transverse member.

5. The transport defined in claim 1 wherein the moving means comprise

A. a lever movably mounted to the front wall which moves between a first position overlying said slot when the support means are in their operating position and a second position away from said slot when the support means are in their loading position; and B. linkage means connecting the lever to the support means.

6. The transport defined in claim 5 and further including a WRITE PROTECT switch including an actuator and mounted in the lever so that its actuator is disposed opposite said slot when the lever is in its said first position.

7. The transport defined in claim 1 and further including

A. means for detecting when a cassette is positioned in said transport with a preferred side facing away from the support means; and B. means responsive to the detecting means for disabling the transport when said preferred side of the cassette is facing the support means.

8. The transport defined in claim 7

A. wherein the detecting means comprise a switch mounted to the support means with its actuator projecting up from the support means for depressing by a cassette whose preferred side faces away from the support means; and B. means for spacing the cassette away from the support means when the preferred side of the cassette is facing the support means so that the cassette does not depress said switch actuator.

9. The transport defined in claim 1 wherein said guide means comprise a pair of tracks extending from the rear of said front wall toward said transverse member, the forward ends of said tracks being aligned with the lower edge of said slot and the rear ends of said tracks being aligned with said locating means.

10. The transport defined in claim 9 wherein said tracks are inclined between their forward and rear ends.

11. The transport defined in claim 1 wherein the head assembly comprises

A. means defining a slide in the transverse member extending parallel to said locating pins;

B. a slider slidably positioned in the slide for movement therealong;

C. a magnetic read/write head mounted to the slider for engagement by a cassette in the transport;

D. means for moving the slider to selected positions along the slide.

12. The transport defined in claim 11 wherein the slider moving means comprise

A. a stepper motor including an armature and mounted to the transverse member so that its armature intercepts the slider;

B. cam means mounted to said armature and engaging said slider so that, when the cam is rotated in steps, it moves the slider along the slide.

13. The transport defined in claim 12 and further including means for detecting when the slider is at one extreme position in the slide.

14. The transport defined in claim 13 wherein the detecting means comprise

A. an electrical switch including an actuator and mounted to the transverse member so that its actuator is adjacent said cam; and B. detent means mounted to rotate with said cam for moving said actuator when the cam rotates to move the slider to its said extreme position.

* * * * *